United States Patent [19]

Hönel et al.

[11] Patent Number: 4,940,768

[45] Date of Patent: Jul. 10, 1990

[54] CURING AGENT FOR SYNTHETIC RESINS, CURABLE MIXTURES CONTAINING THIS CURING AGENT AND ITS USE

[75] Inventors: Michael Hönel, Mainz; Manfred Finke, Kelkheim; Gerd Walz, Wiesbaden; Peter Ziegler, Mainz, all of Fed. Rep. of Germany

[73] Assignee: Hoechst AG, Fed. Rep. of Germany

[21] Appl. No.: 326,898

[22] Filed: Mar. 21, 1989

[30] Foreign Application Priority Data

Mar. 23, 1988 [DE] Fed. Rep. of Germany ....... 3809695

[51] Int. Cl.$^5$ ............................................... C08G 18/80
[52] U.S. Cl. ................................... 528/45; 252/182.2; 252/182.21; 252/182.22; 560/157; 560/158; 560/159; 560/166
[58] Field of Search .......... 528/45; 252/182.2, 182.21, 252/182.22; 560/157, 158, 159, 166

[56] References Cited

U.S. PATENT DOCUMENTS 4,369,301 1/1983 König et al. ........................ 528/45

Primary Examiner—Maurice J. Welsh
Attorney, Agent, or Firm—Bierman and Muserlian

[57] ABSTRACT

A curing agent (A) for resins (B) which can be cured by means of isocyanates, which has an amine number of 20 to 150 mg of KOH/g and an OH number of not more than 20 mg of KOH/g and which contains per molecule at least two masked isocyanate groups which are reactive under the conditions of curing, obtained by reacting (a) an amine which contains at least one $\beta$-hydroxylalkyl group per molecule and has an OH number of 100 to 1,200 mg of KOH/g and an amine number of 100 to 1,200 mg of KOH/g and which, if appropriate, also contains NHCO groups, if appropriate as a mixture with another OH-functional and/or NH-functional compound, with (b) a partly masked isocyanate, if appropriate as a mixture with an at least difunctional, OH-reactive and/or NH-reactive compound.

These curing agents are readily dispersible in aqueous systems, if appropriate after neutralization, and frequently increase stability in aqueous paint formulations.

24 Claims, No Drawings

CURING AGENT FOR SYNTHETIC RESINS, CURABLE MIXTURES CONTAINING THIS CURING AGENT AND ITS USE

DESCRIPTION

Curing agents based on polyisocyanates for use in aqueous paint formulations, particularly electrodeposition paints, are known (cf. inter alia German Offenlegungsschriften Nos. 3,518,732, 3,518,770 and 3,519,953 and also European Published Application Nos. 138,193 and 192,118).

Although these curing agents are relatively stable to hydrolysis, they are not sufficiently dispersible in aqueous systems and result in systems of unstable dispersion and in difficulties during electrodeposition, particularly at fairly high concentrations, which are required in a number of cases to give adequate curing. In addition, curing agents of this type tend to make the cured system brittle.

It has now been found that these disadvantages can, surprisingly, be substantially avoided by employing, as the curing agent, reaction products of certain polyamines containing OH groups and partially masked polyisocyanates.

Accordingly, the invention relates to a curing agent (A) for resins (B) curable by means of isocyanates which has an amine number of 20 to 150 mg of KOH/g and an OH number of not more than 20 mg of KOH/g and contains, per molecule, at least two masked isocyanate groups which are reactive by reacting.

(a) an amine which contains at least one, preferably at least two, β-hydroxyalkyl group(s) per molecule, has an OH number of 100 to 1,200mg of KOH/g and an amine number of 100 to 1,200 mg of KOH/g and which optionally also contains NHCO groups, with (b) a partially masked polyisocyanate, if appropriate mixed with an at least difunctional, OH-reactive and/or NH-reactive compound.

The invention relates additionally to a process for the preparation of this curing agent (A), to curable mixtures containing this curing agent (A) and to the use of this curing agent (A) in curable mixtures, especially in electrodeposition paints.

The curing agent (A) according to the invention has an amine number of 20 to 150 mg of KOH/g, preferably 50 to 100 mg of KOH/g (total amine number, i.e. primary, secondary and tertiary amino groups). The proportion of tertiary amino groups therein is generally 50 to 100%, preferably 75 to 100% and particularly 100%. The OH number of the curing agent is in most cases less than 20 mg of KOH/g, preferably less than 10 mg of KOH/g and especially less than 1 mg of KOH/g to virtually zero. The curing agent according to the invention also contains, as a statistical average per molecule, at least 2, preferably 2 to 10 and especially 4 to 8, masked isocyanate groups which are reactive under the conditions of curing and also, per molecule, preferably at least 2, preferably 2 to 8 and especially 2 to 6, tertiary amino groups. Its molecular weight (number average $M_n$, determined by means of gel chromatography, using polystyrene as standard) is in most cases between 500 and 20,000, preferably 1,500 and 6,000 and particularly preferably 1,500 and 4,000.

The curing agent (A) according to the invention preferably has the following formula (I)

in which

A denotes an organic radical having 2 to 40, preferably 2 to 10, carbon atoms, which has a valence of 2 to 10, preferably contains 2 to 6, and which optionally contains amino groups as well as NHCO and/or NHCONH groups, B and C independently of one another denote groupings of the formulae (II)/(II')

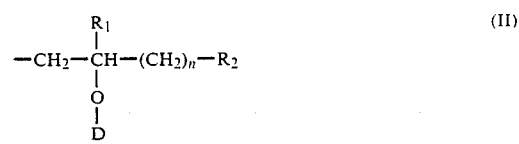

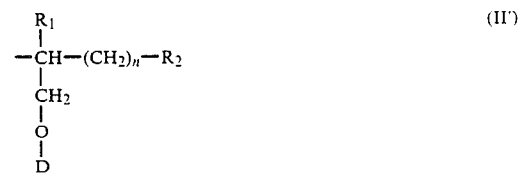

in which $R_1$, $R_2$ and n are as defined in the following formulae (III) and (III') and D represents the radical of a masked polyisocyante (NHCO-F), F representing a hydrocarbon radical which optionally contains hetero atoms, especially oxygen atoms, and has 3 to 40, preferably 3 to 15 carbon atoms and which contains 1 to 3 masked isocyanate groups which are reactive under the conditions of curing, or C denotes H or ($C_1$-$C_6$)-alkyl, m is an integer from 2 to 10, preferably 2 to 6.

The curing agent according to the invention is prepared by reacting an amine containing at least one β-hydroxyalkyl group per molecule, preferably a polyamine (a) (hereinafter "(poly)amine") with a partially masked isocyanate (b).

As a rule, the (poly)amine (a) has an OH number of 100 to 1,200, preferably 200 to 1,000, mg of KOH/g and an amine number (total) of 100 to 1,000, preferably 300 to 700, KOH/g. The amine number only for the tertiary amino groups (determined as specified in DIN 53,176/DIN 16,945/I/5.6; masking of primary/secondary amino groups) is in most cases between 0 and 800, preferably between 200 and 600, mg of KOH/g. The degree of alkoxylation(m/n×100 (%), wherein m denotes the moles of alkylene oxide and n denotes the number of alkylene oxide-reactive NH groups per mole of (poly)amine (=moles of alkylene oxide/mole of (poly)amine)×100), is appropriately 15 to 100%, preferably 50 to 90%. In certain cases this (poly)amine (a) also contains NHCO groups, especially NHCO-NH groups, the number of which is generally 0 to 5, especially 2 or 3, and which originate from the reaction, described later in the text, with polyisocyanates for the purpose of increasing the molecular functionality.

The (poly)amine (a) contains at least one, preferably at least two, β-hydroxyalkyl groups which are attached to the nitrogen atoms and preferably have the formulae (III)/(III')

$$-CH_2-\underset{\underset{OH}{|}}{\overset{\overset{R_1}{|}}{CH}}-(CH_2)_n-R_2 \quad (III)$$

or $$HO-CH_2-\underset{|}{\overset{\overset{R_1}{|}}{C}}-H-(CH_2)_n-R_2 \quad (III')$$

in which:
$R_1$ denotes H or $(C_1-C_6)$-alkyl (branched or unbranched);
$R_2$ denotes H, a hydrocarbon radical, preferably a (cyclo)alkyl radical which can branched or unbranched and can carry substituents such as OH groups and has 1 to 12, preferably 1 to 6, carbon atoms, such as methyl, ethyl, propyl or hexyl, or denotes $(C_1-C_{10})$-alkoxy (branched or unbranched), preferably $(C_2-C_8)$-alkoxy, such as ethoxy, propoxy, butoxy or 2-ethylhexyloxy; (preferably in the case of n=1), or denotes $(C_1-C_{15})$-acyloxy (branched or unbranched), preferably $(C_4-C_{12})$-acyloxy; (preferably in the case of n=1); and
n denotes 0 or 1.

Preferably, 1 to 10, particularly 4 to 8, groups of this type of the formulae (III)/(III') are present. In the case of only one single group of this type, the (poly)amine (a) must also contain additional NH groups.

In a further advantageous embodiment these (poly)amines (a) also contain, as a statistical average, at least one NH group, preferably one or two NH groups. In the subsequent reaction with polyisocyanates (partially masked or unmasked) urea groups are then formed therefrom (additionally also urethane groups as a result of reaction with the OH groups), and these result in very good adhesion between layers.

Suitable (poly)amines (a) are described, for example, in U.S. Pat. Nos. 3,152,188, 3,200,155, 4,465,858 and 4,548,707 and also in German Offenlegungsschrift No. 2,522,219. It is also possible to employ mixtures of different (poly)amines (a).

These (poly)amines (a) are prepared in a known manner by reacting appropriate amines or ammonia with suitable monoepoxides until the desired degree of alkoxylation is reached at temperatures of appropriately 40° to 200° C., preferably 60° to 150° C., and optionally an elevated pressure, for example up to 10 bar. In general, the basic autocatalysis of the amines employed is sufficient in this reaction. If necessary, however, it is also possible to add basic catalysts, such as, for example, triethylamine, alkaline earth metal alcoholates, alkali metal alcoholates, diazobicyclooctane or N,N-dimethylaminopyridine, in amounts of, appropriately, 0.01 to 2% by weight.

The amines used for the reaction with the monoepoxides contain at least one, preferably 2 to 10, amino group(s) per molecule, of which preferably at least two are primary or one is primary and/or one is secondary and/or one is tertiary. The carbon number of these amines is generally 2 to 40, preferably 2 to 20. Some of these primary amino groups can be blocked, for example by means of ketones as ketimine groups. In addition, these amines can also contain OH groups.

Polyamines which are particularly suitable for this purpose are those of the formula (IV)

$$H_2N-(R_3N)_p-R_4' \quad (IV)$$

in which
p is zero or an integer from 1 to 6, preferably 1 to 4,
$R_3$ represents a divalent, preferably non-aromatic hydrocarbon radical having 2 to 18 carbon atoms, preferably a branched or unbranched alkylene radical having 2 to 10 carbon atoms, especially 2 to 6 carbon atoms, or a cycloalkylene radical having 5 to 12 carbon atoms, preferably 6 to 10 carbon atoms, or an aralkylene radical having 7 to 12 carbon atoms, preferably 8 to 10 carbon atoms, and
$R_4$ and $R_4'$ independently of one another represent H or $$-R_3-N\underset{\diagdown R_6}{\diagup R_5}$$

in which $R_3$ has the same meaning as above, and $R_5$ and $R_6$ either independently of one another represent H, $(C_1-C_{20})$-alkyl, preferably $(C_1-=C_6)$-alkyl, hydroxy-$(C_1-C_{16})$-alkyl, preferably $$-CH_2-\underset{\underset{OH}{|}}{CH}-R_7 \; (R_7 = H, (C_1-C_{12})\text{-alkyl},$$

$-CH_2-O-(C_1-C_{12})$-alkyl, $-CH_2-O$-aryl or $$CH_2-O-\underset{\underset{O}{||}}{C}-(C_1-C_{12})\text{-alkyl or } CH_2-\underset{\underset{R_8}{|}}{CH}-CN$$

($R_8$ = H or $(C_1-C_6)$-alkyl) or $R_5$ and $R_6$ and are part of a 5-membered, 6-membered or 7-membered aliphatic ring, subject to the proviso that, if p is zero, $R_4$ is not H.

Additionally, polyamines which are suitable here are also those of the formula (V)

$$G-(R_3NH)_p-R_3J \quad (V)$$

in which G and J are NH: or OH, but at least one of these two radicals represents OH, and $R_3$ and p are as defined in formula (IV).

In addition the polyamines and polyaminopolyols such as are described in German Patent Applications Nos. P 3,644,371.9 and P 3,726,497.4 are also, for example, suitable. Reference is hereby made to these literature references, including the preferred embodiments described therein. In addition, polyaminoamides and polyglycol-polyamines or amine adducts, such as amine/epoxide resin adducts, are also suitable.

The following are examples of suitable polyamines: ethylenediamine, propylenediamine, 2-methylpentamethylenediamine, hexamethylenediamine, trimethylhexamethylenediamine, neopentyldiamine, octamethylenediamine, triacetonediamine, dioxadecanediamine, dioxadodecanediamine and higher homologs, and cycloaliphatic diamines, such as 1,2-, 1,3- or 1,4-cyclohexanediamine; 4,4'-methylenebiscyclohexylamine, 4,4-isopropylenebiscyclohexylamine, isophoronediamine, tricyclododecenyldiamine, menthanediamine, 4,4'-diamino-3,3'-dimethyldicyclohexylmethane, 3-aminomethyl-1-(3-aminopropyl-1-methyl)-4-methylcyclohexane,N-methylethylenediamine,N-aminoethylpiperazine, 2-aminoethylpiperazine, N,N-dimethyethylene- diamine,N,N-dimethylpropylenediamine,N,N-dimethylaminopropylenediamine, N,N-dihydroxyethylethylenediamine, aromatic amines, such as m-xylylenediamine, aliphatic poly(tri- or tetra-)amines, such as diethylenetriamine, dipropylenetriamine,triethylenetetramine,tetraethylenepentamine, pentaethylenehexamine, iminobispropylamine, methyliminobispropylamine,bis(hexamethylene)triamine,N-alkylaminodipropylenetriamines (alkyl=CH$_3$-, C$_4$H$_5$- or (CH$_3$)$_2$N-(CH$_3$)$_3$-) or tetrapropylenepentamine; and also alkanolamines, such as monoethanolamine, diethanolamine, aminoethylethanolamine, N-(2-hydroxypropyl)ethylenediamine, mono-(n or iso)-propanolamine, di-(n or iso)-propanolamine, ethylene glycol bispropylamine, neopentanolamine, methylethanolamine, 2-(2-aminoethoxy)-ethanol, hydroxyethylaminoethylamine, hydroxyethyldiethylenetriamine, 3-aminopropyltrialkoxysilane (alkoxy=methoxy-,ethoxy- or tridecyloxy-), 2-amino-2-hydropxymethyl-1,3-propanediol and the like.

Examples of suitable monoepoxides for the preparation of the polyamines (a) containing β-hydroxyalkyl groups are compounds of the formula (VI)

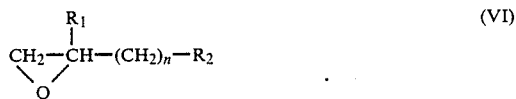

n which R$_1$, R$_2$ and n are as defined in formulae (III)/(III').

The following are examples of monoepoxides of this type, which can also be used in mixtures one with another: epoxidized, monounsaturated hydrocarbons (alkylene oxides), such as ethylene oxide, propylene oxide, hexene-1-oxide, octene-1-oxide, dodecene-1-oxide and styrene oxide; glycidol; glycidyl ethers of (cyclo)aliphatic, monohydric or polyhydric alcohols or monohydric phenols, such as ethyl glycidyl ether, propyl glycidyl ether, hydroxyethyl glycidyl ether, hexyl glycidyl ether, 2-ethylhexyl glycidyl ether and glycidyl ethers of fatty alcohols; and also glycidyl esters of saturated or unsaturated carboxylic acids, preferably monocarboxylic acids, such as the glycidyl ester of (meth)acrylic acid, adipic acid, tetrahydrophthalic acid, hexahydrophthalic acid, versatic acid and fatty acids. As far as further suitable monoepoxide compounds are concerned, reference should be made to "Langkettige α-Epoxide" ("Long-chain α-Epoxides") A 0.1.4 brochure of Interox (Cheshire, England) and to the literature references contained therein.

In order to increase the functionality, the reaction product of (poly)amine and monoepoxide compound can be reacted in one embodiment of the invention with an OH-reactive and/or NH-reactive compound which is at least difunctional. This can be effected in a separate reaction before or after the reaction with the partly masked polyisocyanate (b). It is preferable, however, for both reactions to be carried out in a one-pot reaction. If the reaction product from the (poly)amine and monoepoxide compound still contains free NH groups, the reaction with the difunctional compound takes place primarily with these groups. Otherwise, and in the event of a one-pot reaction, the enlargement of the molecule takes place (predominantly) by reaction with the OH groups. Here too the product thus obtained is intended to be embraced by the term "amine" of the characteristic (a) of claim 1.

Examples of suitable difunctional or polyfunctional compounds are diisocyanates of the type described later in the text or diepoxides analogous to the above formula (VI) (but in this case 2 epoxide groups), the epoxide equivalent weight in the case of the latter being preferably between 100 and 1,000. Suitable diepoxides are described, for example, in Wagner, Sarx: "Lackkunstharze" ("Synthetic Resins for Paints"), pages 174–194 (1971), Carl Hanser Verlag, Munich) and also in European Published Application No. 107,098, to which reference is made here.

The (poly)amine (a) is then reacted with the partially masked polyisocyanate (b), if appropriate during (one-pot reaction) or after the enlargement of the molecule mentioned above for the purpose of increasing its functionality. It is also possible to admix to the (poly)amine (a) up to 55% by weight, preferably up to 40% by weight and especially up to 20% by weight, of any desired other NH-functional and/or OH-functional compounds, provided that these do not have a disadvantageous effect on the curing function. The following are examples of compounds of this type: polyethylene glycols, polypropylene glycols (both having, for example, an average molecular weight of 200–600), polycprolactonediols or polycaprolactonetriols (for example Capa 200, 205 or 305 made by Interox, Cheshire, England), trimethylolpropane, aliphatic diols, such as, for example, 1,4-butanediol, 1,6-hexanediol, neopentyl glycol, and the like. Further compounds suitable for this purpose preferably contain in addition basic groupings which do not react with isocyanates. Examples of these are: N-alkyldipropylenetriamines (alkyl=CH$_3$, C$_4$H$_9$ or (CH$_3$)$_2$-N-CH$_2$)$_3$), N,N-dimethylaminopropyleneamine or N,N-diethylaminopropyleneamine and the like. Thus it is possible, for example, to react one or more (poly)amines (a), preferably those which still have at least one free NH group (if appropriate also mixtures having one and two NH groups), with the difunctional OH-reactive and/or NH-reactive compound (diisocyanate) and with the difunctional, NH-functional/ OH-functional compound (diol, diamine or amino alcohol) and to react the reaction product thus obtained with the half-masked polyisocyanate (b). This reaction also can be carried out as a one-pot reaction.

Polyisocyanates which can be employed are any polyisocyanates known in the polyurethane or paint field, for example aliphatic, cycloaliphatic or aromatic polyisocyanates. Typical examples of the polyisocyanates used are 2,4-toluylene diisocyanate, 2,6-toluylene diisocyanate, xylylene diisocyanate, 4,4,-diphenylmethane diisocyanate, 4,4,-triphenylmethyl triisocyanate, triphenylmethane triisocyanate, polyphemylpolymethyl isocyanate, hexamethylene diisocyanate, trimethylhexamethylene diisocyanate, tetramethylhexamethylene diisocyanate, 2,2,4-(2,4,4)-methylcyclohexyl diisocyanate, isophorone diisocyanate, dicyclohexylmethyl diisocyanate, diethyl fumarate-hexyl isocyanate, bis-(3-methyl-4-isocyanatocyclohexyl)-methane, 2,2-bis-(4-isocyanatocyclohexyl)-propane, the methyl ester of lysine diisocyanate, the biuret of hexamethylene diisocyanate, diisocyanates of dimeric acids, 1-methylbenzene 2,4,5-triisocyanate, biphenyl 2,4,4'-triisocyanate and the triisocyanate formed from 3 moles of hexamethylene diisocyanate and 1 mole of water and containing 16% of NCO.

As well as these simple polyisocyanates, polyisocyanates containing hetero atoms in the radical linking the isocyanate groups are also suitable. Examples of these are polyisocyanates containing carbodiimide groups, allophanate groups, isocyanurate groups, urethane groups, acylated urea groups or biuret groups.

Finally, suitable polyisocyanates are also the known prepolymers containing terminal isocyanate groups such as are accessible, in particular, by reacting the abovementioned simple polyisocyanates, above all diisocyanates, with excess amounts of organic compounds containing at least two groups reactive towards isocyanate groups. Further suitable polyisocyanates are described, for example, in German Patent Application No. P 3,644,372.7. It is also possible to use mixtures of the various polyisocyanates.

Suitable masking agents are aliphatic, cycloaliphatic or alkyl-aromatic (monohydric) alcohols, for example lower aliphatic alcohols, such as methyl alcohol, ethyl alcohol, the various propyl, butyl and hexyl alcohols, haptyl, octyl, nonyl and decyl alcohols an the like; also unsaturated alcohols, such as propargyl and allyl alcohols, cycloaliphatic alcohols, such as cyclopentanol or cyclohexanol, alkyl-aromatic alcohols such as benzyl alcohol, methylbenzyl, p-methoxybenzyl and p-nitrobenzyl alcohol, α-hydroxyalkylpyridines, furfuryl alcohol and monoethers of glycols, such as ethylene glycol monoethyl ether or monobutyl ether, methoxypropanol, 3-methyl-3-methoxybutanol and the like. Further masking agents are ketoximes, having appropriately 3 to 20 carbon atoms, preferably 3 to 10 carbon atoms, such as acetone oxime, methyl ethyl ketone oxime (=butanone oxime), hexanone oxime (such as methyl butyl ketone oxime), heptanone oxime (such as methyl n-amyl ketone oxime), octanone oxime and cyclohexanone oxime; also CH-acid compounds, such as alkyl malonates, acetoacetic esters and cyanoacetic esters having in each case 1 to 4 carbon atoms in the ester group, NH-acid compounds, such as caprolactam or amino alcohols, such as dimethylethanolamine or diethylethanolamine. These amino alcohols can also be used, for example, as a mixture with the other masking agents indicated, for instance in amounts of up to 25 mole %, in particular 6–12 mole %, relative to the mixture. Phenol, which is known as a blocking agent, can be employed, in particular, in cases where the reaction product is used for the preparation of nonaqueous paints.

The reaction of the amine (a) with the partly masked polyisocyanate (b) and, if appropriate, a polyfunctional compound, in particular an unmasked diisocyanate, is carried out under conditions which substantially preclude curing of the reaction mixture. This can be achieved, for example, by the selection of the ratios. The curing agent (A) preferably contains less than 5% by weight, in particular less than 1% by weight, of crosslinked and/or higher-molecular ($\overline{M}_n > 10,000$) constituents.

The amount of partly masked polyisocyanate should also be chosen so that an adequate number, preferably 4 to 10, of masked isocyanate groups, active for crosslinking, are introduced into the amine (a). It is appropriate in this connection to refer to the percentage content, per molecule, of the isocyanate used for masking. For toluylene diisocyanate (TDI) this range is between 30 and 50%, preferably between 38 and 47%. The progress of the reaction is followed by the known titration (ISO-DP ABCD or DIN 53,185) of the % NCO content. The reaction is discontinued after a % NCO content of <0.2 has been reached.

In general, the presence of a solvent is advantageous for the reaction between the polyamine (a) and the polyisocyanate(s). Solvents suitable for this purpose are inert, preferably aprotic, solvents which, if used in aqueous paint formulations, should be capable of removal from the system as easily as possible. The following examples may be mentioned here: halogenated hydrocarbons (less suitable in the case of use as a dipping paint), ethers, such as diethyl ether, 1,2-dimethoxyethane, tetrahydrofuran or dioxane; ketones, such as, for example, acetone, methyl ethyl ketone, methyl isobutyl ketone, cyclohexanone and the like; esters (less suitable in the case of use as a dipping paint), such as butyl acetate, ethylglycol acetate or methoxypropyl acetate; N-methylpyrrolidone; (cyclo)aliphatic and/or aromatic hydrocarbons, such as hexane, heptane, cyclohexane, benzene, toluene, the various xylenes and, less preferably, aromatic solvents within the boiling range from approx. 150° to 180° C. (higher-boiling mineral oil fractions, such as ®Solvesso). In this regard the solvents can be employed on their own or as a mixture.

The temperature of the reaction is, in general, between 30° and 80° C. and is adjusted by occasional cooling or heating. (The temperature can in some cases affect the sequence of the reaction with NCO (NH before OH) in the one-pot process).

The curing agents according to the invention are dispersible in an aqueous system, if appropriate after prior neutralization with acid, and can be added in considerable amounts to the aqueous paint formulation, for example an electrodeposition paint, without adversely affecting the stability of the system. In many cases the effect of these curing agents is, entirely on the contrary, even to improve the stability.

The invention also relates to curable mixtures based on the curing component (A), a binder (B) containing isocyanate-reactive groups, if appropriate a thinner (C), and also, if appropriate, additives (D). It is possible by this means to prepare coatings having very good properties. Coatings of this type can be applied by the customary methods, such as brushing, spraying, dipping, curtain coating, squeegeeing or, preferably, by cathodic deposition, to a very wide variety of substrates, such as, preferably, metal.

The molecular weight (number average $\overline{M}_n$) of the binder (B), determined by means of gel chromatography (polystyrene as standard), is usually within the range from about 300 to 50,000, preferably about 1,000 to 20,000. Preferably, therefore, these binders (B) have a resinous character. In special cases the molecular weight can be 100,000 or more. Suitable polymers in this connection are polymers, polycondensates or polyaddition compounds containing groups reactive with isocyanate groups, such as hydroxyl and/or amino groups, at least two of these on average being present per molecule.

The functionality (NH, NH$_2$ or OH) of these polymers can be, for example, between 20 and 1,500, preferably between 100 and 1,000 and particularly preferably between 100 and 500, according to the total of the amine number (relative only to NH and NH$_2$) and the hydroxyl number.

Examples of synthetic resins (polyols) containing OH groups are polyether-polyols, polyacetal polyols, polyester-amide polyols, epoxide resin polyols or reaction products thereof with CO$_2$, phenolic resin polyols, polyurea polyols, polyurethane polyols, partly saponified homopolymers and copolymers of vinyl esters, partly acetalized polyvinyl alcohols, polyester-polyols or acrylic resin polyols. Phenolic, urea or melamine resins containing OH are also suitable in this regard. Polyols of this type, which can also be employed as a mixture, are described, for example, in German Offenlengungsschrift No. 3,124,784 and in European Published Application Nos. 123,880 and 189,728.

Epoxide resin polyols, polyester-polyols, polyurethane polyols, polyether-polyols and acrylic resin polyols are preferred.

Synthetic resins (B) containing hydroxyl and amino groups are described, for example, in the Journal of Coatings Technology, Volume 54, No. 686, (1982), pages 33 to 41 ("Polymer Compositions for Cationic Electrodepositable Coatings"), to which reference is made. Polymers formed from $\alpha,\beta$-olefinically unsaturated monomers containing hydroxyl and/or amino groups may be mentioned here. The introduction of the hydroxyl and/or amino groups can be effected by using corresponding monomers in the copolymerization, for example by means of hydroxyesters or aminoesters of $\alpha,\beta$-olefinically unsaturated carboxylic acids, such as hydroxyalkyl (meth)acrylates or aminoalkyl (meth)acrylates, or by a polymer-analogous reaction with diamines or polyamines, for example with N,N-dimethylaminopropylamine, with the formation of amide, amino or urethane groups. A further group is constituted by the polyaminopolyamides obtainable from dimerized fatty acids and polyamines, or the aminopolyether-polyols accessible, for example, by reacting epoxide resins with primary or secondary amines; these are particularly suitable. They are accessible, for example, by reacting primary or secondary amines with a polyglycidyl ether. In this reaction there should be sufficient epoxide groups present for all the amino groups which are not marked to be converted into tertiary amino groups. The preferred polyglycidyl ethers are polyglycidyl ethers of bisphenol A and similar polyphenols. They can prepared, for example, by etherifying a polyphenol with an epihalogenohydrin, such as epichlorohydrin, in the presence of alkali.

Instead of the polyglycidyl ethers it is also possible to employ reaction products thereof with CO$_2$. These products contain cyclic carbonate groups which can be employed together with primary amines, with the formation of urethanes. Depending on the molar ratios of polyglycidyl ether and CO$_2$, compounds no longer containing epoxide groups or compounds containing epoxide groups and cyclic carbonate groups are obtained in the reaction with CO$_2$. Cyclic carbonate groups of this type can also be introduced into the polymer chain via corresponding monomers containing these groups; in this regard see German Patent Application Nos. P 3,644,372.7 and P 3,644,373. The reaction of polymers containing cyclic carbonate groups of this type with amines with the formation of so-called aminourethanes is described, for example, in European Patent Application Nos. 87,101,797.6 and 87,197,309.4 and in German Patent Application No. P 3,644,370.0.

The polyglycidyl ethers of the polyphenols or reaction products thereof with CO$_2$ can be reacted as such with the amines, but it is frequently advantageous to react part of the reactive epoxide groups with a modifying material in order to improve the film properties. Reacting the epoxide groups with a polyol or a polycarboxylic acid is particularly preferred. This modification is preferably carried out before the reaction of the polyglycidyl ethers, or reaction products thereof with CO$_2$, with the primary or secondary amines. It is also possible, however, to choose such a ratio between the polyglycidyl ether used as the starting material and the amines that there is an excess of epoxy groups. The epoxy groups can then be reacted with the polycarboxylic acids or polyols. It is also possible to modify further the end product, which no longer contains epoxide groups, by reacting the hydroxyl groups with glycidyl ethers.

When used in electrodeposition paints, the number of basic groups in the binder (B) should be so chosen as to ensure adequate dilutability with water in the acid medium.

The ratio of curing agent (A) and binder (B) depends on the desired density of crosslinking and depends on the functionality of the curing agent(s) (i.e. on the total amount of masked isocyanate groups, active for crosslinking, which can proportionately also be introduced by means of the binder) and on the functionality of the binder (number of hydroxyl and/or amino groups). In general, the amount of (A) is 5 to 85, preferably 25 to 48, % by weight, relative to (A)+(B).

Suitable thinners (C) are the conventional paint solvents, for example those described earlier in the text. It is preferable, however, to employ water for this purpose, if appropriate mixed with organic solvents of this type. It is advantageous for aqueous systems of this type, which are preferably used as electrodeposition paints, to neutralize the basic amino groups partly or completely in order thereby to obtain paint formulations which can be electrically deposited from an aqueous solution at a bath pH between about 3 and 9. In general, the neutralization of the basic groups is carried out by means of water-soluble acids, for example formic acid, acetic acid, lactic acid or phosphoric acid or suitable mixtures. The amount of acid in an individual case depends on the properties of the resin used and is generally only carried out to such an extent that the resin is solubilized or converted into a stable, aqueous emulsion (or dispersion). In general, degrees of neutralization (DN) of 20 to 70% are required for this purpose. The meQ values quoted in the examples (mmole of acid/100 g of solid) are related to this in the following manner (AN=amine number):

$$meQ = \frac{DN \times AN}{5.61}$$

The solids content of the electrodeposition paint is generally 10 to 30% by weight.

Aqueous formulations having a particularly low content of volatile organic solvents, for example 0.5 to 5% by weight, relative to total solids content (determined at 125° C./60 minutes) are obtained—as described, for example, in German Patent Application No. P 3,602,980.7—by removing by distillation the solvents present in the binders from their preparation or solution. It is preferable to carry out this stage of the process on the partly neutralized resin under reduced pressure.

As customary additives within the meaning of (D) which can, if necessary be present in the curable mixture according to the invention, mentioned may be made here—depending on the particular end use—of the customary paint additives, such as pigments (iron ozides, lead oxides, lead silicates, titanium dioxide, barium sulfate, zinc oxide, zinc sulfide, phthalocyanine complexes etc.), pigment pastes, antioxidants, (UV)-stabilizers, leveling agents or thickeners, antifoaming agents and/or wetting agents, reactive thinners, fillers (talc, mica, kaolin, chalk, powdered quartz, powdered asbestos, powdered slate, varieties of silica, silicates etc.), additional curing agents (as described, for example, in German Patent Application No. P 3,726,497.4) and additional curable compounds, catalysts and the like. These additives can be added to the mixture, if appropriate, only immediately before processing.

Examples of catalysts suitable for accelerating curing are salts or complexes of metals, such as, for example, lead, zinc, iron, tin, manganese and bismuth. Preferred metal catalysts in this regard are lead compounds, such as lead carboxylates having 1 to 10 carbon atoms, for example lead formate, lead acetate, lead propionate, lead lactate, lead octoate, lead acetylacetonate etc., or tin compounds, such as dibutyltin diacetate, dibutyltin dilaurate or dibutyltin oxide; as regards other suitable tin compounds and the metering of these tin catalysts into the paint formulation reference should be made to the above German Patent Application No. P 3,726,497.4.

In general, the amount of catalyst is 0.1 to 6% by weight, preferably 0.2 to 3% by weight, calculated as metal and relative to the sum of (A) and (B). It can be varied, depending on the reactivity of the compounds (A) and (B), the nature of the optionally present solvent, the activity of the catalyst and the intended procedure for the process. The metal catalysts can be added to the paint as a direct mixture with the starting materials or separately, dispersed in a suitable binder.

The curable mixtures according to the invention, in particular aqueous paint formulations (electrodeposition paints), have, in particular, very good stability on storage. The electrodeposition paints according to the invention also exhibit an unimpaired coagulation behavior. This prevents irregular deposition, firstly in the sense of differing layer thicknesses on the coated substrate and secondly in the sense of enrichment of one component in the bath. The very good stability, coupled with unimpaired coagulation of the paint formulations, also manifests itself in very good L-sheet metal coatings. The electrical deposition of the paint particles from the electrodeposition paints is carried out by known processes to which reference is made here. Deposition can be carried out on all electrically conducting substrates, for example metals, such as steel, copper, aluminum and the like.

After deposition the coating is cured by customary processes at elevated temperatures which, in general, depend on the nature of the curing component, the temperatures used being from 100° to 220° C., preferably 130° to 180° C.

The coatings obtained are distinguished, in particular, by excellent mechanical load-bearing capacity (indentation test and Erichsen index) and excellent resistance to the salt spray test (ASTM-B-117-64; 960 hours on zinc-phosphated sheet iron).

The paint I (cf. the examples following) is regarded at the present time as the best embodiment of the invention.

In the following examples pts. denotes parts by weight and % denotes percent by weight. The amine numbers relate in each case to solid resin; they were determined as specified in DIN 53,176 and DIN 16,945/I.5.6).

EXAMPLES

I. Preparation of the curing agents (A) according to the invention (1) Preparation of the polyamines (a)
General instructions:

The polyamine was initially placed at 70° C. in a dry autoclave, and the apparatus was flushed with nitrogen. Account was taken, in the weight of the ethylene oxide, of the amount of ethylene oxide retained in the line. About 14-20% of the amount of ethylene oxide were added rapidly, in order to start the reaction, i.e. use was made of the exothermic reaction which takes place at this stage. In the course of this the temperature rose sharply and was intercepted at 120°-140° C. by occasional cooling (about 5-10 minutes). The remaining amount of ethylene oxide was then added continuously at 110°-120° C. (up to an excess pressure of 5 bar) in the course of 1 to 2 hours. The lines were then flushed with nitrogen. The reaction was completed for 1 hour at 100° C. All the ethoxylated amines were freed from water virtually quantitatively by recycling with toluene before being reacted with the isocyanate.

Further details can be seen from Table 1 below:

TABLE 1

| | Starting materials | | Reaction product | | | Degree of ethoxylation (%) |
|---|---|---|---|---|---|---|
| | | Ethylene | | Amine number | | |
| Type | Amine Weight | oxide (weight) | Type (symbol) | total | tertiary | |
| Bis H[1] | 215 | 132 | BisH(EO)₃ | 473 | 320 | 60 |
| | 215 | 176 | BisH(EO)₄ | 420 | 295 | 80 |
| | 102 | 132 | DETA(EO)₃ | 704 | 427 | 60 |
| DETA[2] | 102 | 176 | DETA(EO)₄ | 598 | 351 | 80 |
| DMPA[3] | 102 | 44 | DMAPA(EO)₁ | 384 | — | 50 |

[1] BisH = bishexamethylenetriamine
[2] DETA = diethylenetriamine
[3] DMAPA = dimethylaminopropylamine (2) Preparation of partially masked polyisocyanates (b) (2.1) 124 pts (1.05 equivalents of OH) of butylglycol were run slowly into 174 pts of toluylene diisocyanate (2 equivalents of NCO; 80% of 2,4-isomer and 20% of 2,6-isomer) at 25°-40° C. in the presence of 0.01% of triethylamine as catalyst; reaction was continued to an NCO value of about 13.5-14.0%.

(2.2) Example 2.1 was repeated, with the difference that a mixture of 109.15 pts (0.925 equivalent of OH) of butylglycol and 11.125 pts (0.125 equivalent of OH) of N,N-dimethylethanolamine was employed instead of butylglycol (% NCO ~ 13.8-14.3).

(3) Synthesis of the curing agents:

(3.1) 102.3 pts (0.55 mol) of ®Beckopox-080 (2-ethylhexyl glycidyl ether) were added to 129.3 pts (0.55 mol) of DETA(EO)$_3$ in 116.80 pts of N-methylpyrrolidone in the course of 30 minutes at 60° C. The temperature rose to 80° C., and the reaction mixture was then kept at this temperature until an epoxide number of about 0 had been reached (about 3 hours). The mixture was then diluted with 337 pts of dimethyldiglycol and cooled to 60° C. 819.5 pts (2.75 mol) of the partly masked polyisocyanate according to 2.1 were run in over the course of 30 minutes and the mixture was then reacted for 4 hours at 70° C. until a % NCO value of <0.15 had been reached. The amine number of the resulting curing agent was about 57.5 mg of KOH/g.

(3.2) Example 3.1 was repeated, with the difference that 191 pts (0.55 mol) of BisH(EO)$_3$ in 123.8 pts of N-methylpyrrolidone were employed instead of DETA(EO)$_3$. 354 pts of dimethyldiglycol were used for the subsequent dilution. The amine number of the product obtained was about 55.7 mg of KOH/g.

(3.3) 184.1 pts (0.66 mol) of DETA(EO)$_4$ in 114 pts of N-methylpyrrolidone and 490 pts of dimethyldiglycol were initially taken. 65.3 pts of hexamethylene diisocyanate and 775 pts of the partly masked polyisocyanate according to 2.2 in 79 pts of dimethyldiglycol were added to this mixture in the course of 30 minutes at 40° C. The reaction mixture was then kept at 50° C. for 3 hours until a % NCO value of about 0 had been reached. The amine number of the curing agent was about 84.4 mg of KOH/g.

(3.4) 250 pts (0.64 mol) of BisH(EO)$_4$ and 500 pts of toluene were initially taken and 763 pts (2.56 mol) of the partly masked polyisocyanate according to 2.1, 54 pts of hexamethylene diisocyanate and 211 pts of toluene were added dropwise, in the form of a mixture, at 50° C. in the course of 0.5 hour, with occasional cooling. No interference was caused by a transient inhomogeneity which occurred meanwhile. Stirring was continued for a further 3.5 hours at 60° C. and a % NCO value of about 0 was obtained. The amine number of the resulting product was about 72 mg of KOH/g.

(3.5) 2,384 pts (8 mol) of the compound 2.1. in 462 pts of toluene were added at 40 to 60° C. to 782 pts (2 mol) of BisH(EO)$_4$ in 500 pts of toluene (duration of addition approx. 1 hour). As soon as the NCO value had fallen to approx. 0.2%, 146 pts (1 mol) of DMAPA-EO) were added, the mixture was thoroughly homogenized, and 336 pts of hexamethylene diisocyanate (2 mol) were then run in slowly at 60 to 80° C. in the course of 1 hour. When the NCO value had reached a value of approx. 0.2%, the mixture was diluted with 962 pts of methoxypropan-2-ol and stirring was continued for 1 hour at approx. 80° C. The resulting product had a low viscosity and a solids content of approx. 65%. The curing agent contained approx. 38.2% of toluylene diisocyanate, calculated on solid resin; its amine number was approx. 78 mg of KOH/g.

II. Preparation of the binders (B)

(4.1) Using Example VIII/26 of German Patent Application No. P 3,624,454.6 as a model, a binder solution was prepared in the following way:

832 pts of the monocarbonate of ®Epicote 828 (diglycidyl ether of bisphenol A; 2 equivalents of epoxide), 830 pts of ®Capa 205 (=polycaprolactonediol of average molecular weight 830) and 712 pts of toluene were mixed and reacted at 70 to 140° C. in the presence of approx. 0.3% of boron trifluoride etherate until an epoxide number of approx. 0 had been reached. 1,497 pts of the biscarbonate of ®Epicote 1001 (2 equivalents of carbonate, a 70% strength suspension in toluene) were then added and the mixture was thoroughly homogenized and 1,192 pts of the compound according to this Example 2.1 were run in at 60 to 80° C. in the course of 2 hours. The mixture was then kept at 80° C. until a % NCO of approx 0 had been reached. The reaction mixture was then cooled to approx. 40° C., 645 pts of bishexamethylenetriamine were added and a further 596 pts of compound 2.1 were added at 30° to 40° C. in the course of 2 to 3 hours and the mixture was then reacted further at 40° C. until a % NCO value of <0.1% had been reached. The binder mixture thus obtained was formulated to 66% solids with 1,490 pts of methoxypropanol, heated to approx. 70° C. and kept at this temperature until an amine number of approx. 33 (relative to solid binder) had been reached.

The mixture was then partially neutralized with 142 pts of formic acid (50% strength) to an meQ value of approx. 30 (solids content about 65%, 1 hour at 125° C.).

(4.2) Analogously to European Published Application 12,463 and German Offenlegungsschrift No. 3,615,810, 301 pts of diethanolamine, 189 pts of N,N-dimethylaminopropylamine and 1,147 pts of an adduct formed from 2 mol of 2-methylpentamethylenediamine and 4 mol of the glycidyl ester of versatic acid (Cardura ®E 10 made by Shell) were added to 5,273 pts of bisphenol A epoxide resin (epoxide equivalent weight 475) in 3,000 pts of ethoxypropanol. The reaction mixture was kept at 60° to 90° C. for 4 hours, with stirring, and was then kept at 120° C. for 1 hour. It was then diluted with ethoxypropanol to a solids content of 65% (about 720 g).

Hydroxyl number: 276 mg of KOH/g of resin solids.

Hydroxyl number (primary OH): 55 mg of KOH/g of resin solids.

Hydrogenation iodine number: virtually zero.

Amine number (tertiary amino groups): 78 mg of KOH/g of resin solids.

III. The use of the curing agent (A) in paints

Unpigmented lacquers (5a) Preparation of the lacquers:

Examples 5.1-5.3: In the following examples clear lacquers of approx. 15% solids content and a TDI content of approx. 18% (relative to resin solids) were prepared using the curing agent according to 3.1 to 3.3, in each case in accordance with the following formulation:

TABLE 2

| Example | Curing agent according to 3.1 (pts) | 3.2 (pts) | 3.3 (pts) | Binder according to 4.1 (pts) | Dibutyltin dilaurate (pts) | 50% strength formic acid (pts) | Completely demineralized water (pts) |
|---|---|---|---|---|---|---|---|
| 5.1 | 84.7 | | | 139.5 | 7.5 | 6.9 | 761.4 |
| 5.2 | | 89.7 | | 134.4 | 7.5 | 6.9 | 761.4 |

TABLE 2-continued

| Example | Curing agent according to 3.1 (pts) | Curing agent according to 3.2 (pts) | Curing agent according to 3.3 (pts) | Binder according to 4.1 (pts) | Dibutyltin dilaurate (pts) | 50% strength formic acid (pts) | Completely demineralized water (pts) |
|---|---|---|---|---|---|---|---|
| 5.3 | | | 100.2 | 138.6 | 7.5 | 6.9 | 750.0 |

The curing agent, binder and dibutyltin dilaurate were weighed out and their mixture was thoroughly homogenized, then formic acid was added and the mixture was again thoroughly homogenized and diluted with completely demineralized water (E water) in a suitable dispersing unit (for example the "Pendraulic" dissolver made by Stephen, Hameln). Liquors prepared in this way were poured into a beaker, aged for 24 hours on a magnetic stirring apparatus and then subjected to testing.

(5b) Use as electrodeposition paint Paint formulations 5.1, 5.2 and 5.3 were subjected to cataphoretic deposition in an open glass vessel. The cathode used was zinc-phosphated steel sheet and the anode, at a distance of 5 to 10 cm from the cathode, was plain steel sheet. The bath temperature was 28° C. and the duration of deposition was 2 minutes.

The voltages applied in each case, the film thicknesses achieved and the properties of the deposited and subsequently cured films (baking conditions: temperature of object 180° C. for 20 minutes) are shown in summarized form in the table below:

TABLE 3

| Bath data/film properties | Paint according to 4.1. | Paint according to 4.2. | Paint according to 4.3. |
|---|---|---|---|
| Deposition voltage (V) | 300 | 250 | 320 |
| Film thickness (μm) | 18–20 | 25 | 17–19 |
| Flow[1] | 1 | 2 | 1 |
| Indentation test[2] | 160 | 140 | 160 |
| Erichsen index (mm) | 6.0 | 5.0 | 7.0 |
| Crosslinking[3] | 2 | 2 | 2 |
| pH (23° C.) | 5.0 | 5.2 | 5.4 |
| Conductivity (μS at 23° C.) | 1,700 | 1,600 | 1,430 |
| MCT[4] (°C.) | <20 | <20 | <20 |
| SR[5] | 37.0 | 83.0 | 7.0 |

[1] 0 is best value; 5 is worst value.
[2] 4 pounds; 1.2 cm diameter; figures in inch/pounds
[3] Acetone test: constant exposure to a cottonwool wadding impregnated with acetone; figures in minutes of exposure time
[4] MCT = Minimum coalescing temperature
[5] The stability of the paints was determined as a sieve residue (SR) by filtration through a ®GAF filter grid (filter made by the GAF Corporation) of mesh width 30 μm. The figures are in mg/1,000 ml of liquor, measured on a liquor aged for 24 hours. The residue was dried for 1 hour at 125° C.

Pigmented paints
(6a) Preparation of the unpigmented lacquers

For checking liquor stability, lacquers mixed with various binders were first prepared using the curing agents according to Example 3.4 and 3.5.; see Table 4 below for the constituents and amounts:

TABLE 4

| Lacquer I | Lacquer II |
|---|---|
| 1,137 pts of binder 4.1 (65% strength in toluene/methoxypropanol) | 1,539 pts of binder 4.2 (65% strength in ethoxypropanol) |
| 1,137 pts of binder 4.2 (65% strength in ethoxypropanol) | |
| 870 pts of curing agent 3.4 (60% strength in toluene) | 1,370 of curing agent 3.5 (65% strength in toluene/methoxypropanol) |

TABLE 4-continued

| Lacquer I | Lacquer II |
|---|---|
| 25.2 pts of butyldiglycol | 38 pts of butyldiglycol |
| 22.2 pts of formic acid (50% strength) | 52.2 pts of formic acid (50% strength) |
| 2,778 pts of E water | 2,627 pts of E water |

The binder, the curing agent, the butyldiglycol and the formic acid were initially taken and the mixture thoroughly homogenized, and 922 g (lacquer I) and 920 g (lacquer II) of solvent were then stripped off by vacuum distillation at temperatures of 40°–80° C. (jacket temperature) and pressures down to a minimum of 0.02 bar in the course of 50 minutes. In order to avoid foaming the pressure was reduced only at a suitably slow rate. When distillation was complete air was admitted and the residue was dispersed with E water at 60° C., with vigorous stirring, to a solids content of 40% by weight (determined at 125° C./1 hour). The low-viscosity dispersion thus obtained was filtered through a 25 μm GAF filter at 40° C. The meQ values were approx. 25 (lacquer I) and approx. 30 (lacquer II).

The stability of these lacquers was then determined by subjecting them to accelerated aging (storage for 1 week at 40° C.) and then measuring the sieve residue (SR), the pH and the conductivity again:

TABLE 5

| | Lacquer I | | Lacquer II | |
|---|---|---|---|---|
| | fresh | aged | fresh | aged |
| SR[5] | <10 | ~30 | ~20 | ~50 |
| pH | 6.6 | 6.5 | 6.7 | 6.5 |
| Conductivity (μS at 23° C.) | 1,600 | 1,600 | 2,100 | 2,000 |

(6b) Preparation of the pigment paste

A paste binder was prepared as in Example 2 of Austrian Patent No. 380,264. This was effected by reacting 320 parts of an epoxide resin based on polypropylene glycol (equivalent weight approx. 320) at 75° to 80° C. with 134 pts of tallow fatty amine and 52 pts of diethylaminopropylamine in a reaction vessel until an epoxide value of 0 was reached. After 30 pts of paraformaldehyde (91% strength) had been added, 19 pts of water of reaction were stripped off using special petroleum ether (boiling point 80° to 120° C.), and the entraining agent was then removed by vacuum distillation.

The past resin thus obtained was then processed with the other constituents of the formulation below according to the procedure described in German Patent Application No. P 3,726,497.4 to give a pigment paste:

70.5 pts of paste resin (100% strength)
7.8 pts of formic acid (100% strength; to meQ 120)
51.0 pts of basic lead silicate pigment
80.0 pts of dibutyltin oxide
9.2 pts of carbon black (®Printex 25)
370.0 pts of titanium dioxide (®Kronos RN 59)
13.2 pts of butylglycol
220.0 pts of E water (to grinding viscosity)

108.0 pts of E water (to processing viscosity).

The solids content (180° C./0.5 hour) of this pigment paste was approx. 63% and the pigment/binder ratio was approx. 12:1.

(6c) Use as an electrodeposition paint Paints I/II were first formulated with E water to a solids content of 25% by weight. 286 pts of the pigment paste 6b were then introduced with stirring into 1,125 pts of each of these paints and the solids content of the liquor was reduced with E water to 18% by weight (125° C./1 hour). The pigment/binder ratio in the liquor was about 0.4:1.

Deposition was carrier out as described in 5b):

TABLE 6

| Bath data/film properties | Pigmented paint I | Pigmented paint II |
|---|---|---|
| Initial voltage (V) | 375 | 375 |
| Deposition voltage (V) | 350 | 350 |
| Film thickness (μm) | 18–20 | 20–22 |
| Flow[1] | 1 | 2 |
| Indentation test[2] | 120 | 120 |
| Erichsen index (mm) | 7.0 | 8.0 |
| Crosslinking[3] | 1 | 1 |
| pH | 6.5 | 6.6 |
| Conductivity (μS at 23° C.) | 1,300 | 1,500 |
| MCT[4] (°C.) | <25 | <25 |
| SR[5] | 30 | 60 |
| L-sheet[6] | 1 | 2 |

For [1] to [5] see Table 3
[6]"L-sheet coating": this is effected by bending a zinc-phosphated sheet (approx. 10 × 20 cm) through a right angle at its lower end (approx. 3 cm of horizontal area) and hanging it in the coating bath in such a way that the horizontal side of the L is about 10 cm below the surface of the paint bath. Coating is carried out with the stirrer switched off and at a duration of coating of 2 minutes. After coating is complete the sheet remains for a further 2 minutes in the bath. The sheet is then taken out of the bath, rinsed for a further 2 minutes with water and baked (see above). The flow, gloss and sedimentation phenomena of the sheet are asessed visually (0 is best value and 5 is worst value).

out of the bath, rinsed for a further 2 minutes with water and baked (see above). The flow, gloss and sedimentation phenomena of the sheet are assessed visually (0 is best value and 5 is worst value).

Both batches of paint exhibited excellent stability on zinc-phosphated sheet when exposed to salt spray (ASTM-B 117-64) for 960 hours (subsurface corrosion at cut <2 mm).

Comparison test 7.1 Preparation of the curing agent

A blocked isocyanate crosslinking agent (polyurethane crosslinking agent) was prepared by adding 197 pts of butylglycol slowly to 291 pts of an 80:20 mixture of isomers of 2,4-/2,6-toluylene diisocyanate with stirring and under an atmosphere of nitrogen, the reaction temperature being kept below 38° C. by external cooling. The mixture was then kept at 38° C. for a further half hour and was then heated to 60° C., after which 75 pts of trimethylolpropane followed by 0.08 pts of dibutyltin dilaurate as catalyst were added. After an exothermic reaction at the start, the mixture was kept at 121° C. for 1.5 hours until essentially the whole of the isocyanate groups had been consumed, which was determined by NCO titration and infrared spectroscopy. The mixture was then diluted (65% strength) with 303 pts of methoxypropan-2-ol.

7.2 Preparation of the paint (pigmented)

The electrodeposition paints III and IV were prepared similarly to 6c, using the pigment paste of 6b, to the following formulation:

TABLE 7

| Paint III | Paint IV |
|---|---|
| 90 pts of binder 4.1 (65% strength) | — |
| 360 pts of binder 4.2 (65% strength) | 415 pts of binder 4.2 (65% strength) |
| 242 pts of curing agent 7.1 | 277 pts of curing agent 7.1 |
| 20.7 pts of formic acid (50% strength) | 20.7 pts of formic acid (50% strength) |
| 286 pts of pigment paste (6b) | 286 pts of pigment paste (6b) |
| 2,500 pts of E water | 2,500 pts of E water |

7.3 Use as an electrodeposition paint

Paints III and IV were formulated with E water to a liquor solids content of 18% by weight (125? C/1 hour). The pigment/binder ratio in the liquor was about 0.4:1 and the meQ value approx. 50.

Deposition was carried out as in (5b):

TABLE 8

| Bath data/film properties | Paint III | Paint IV |
|---|---|---|
| Initial voltage (V) | 300 | 250 |
| Deposition voltage (V) | 275 | 225 |
| Film thickness (μm)* | 18–20 | 20–21 |
| Flow[1]* | 2 | 3 |
| Indentation test[2] | 60 | 60 |
| Erichsen index (mm) | 6.6 | 6.5 |
| Crosslinking[3] | 2 | 2 |
| pH | 5.8 | 6.0 |
| Conductivity (μS at 23° C.) | 1,000 | 1,360 |
| MCT[4] (°C.) | <25 | <25 |
| SR[5] | 500 | 300 |
| L-sheet[6] | 4 | 4 |

For [1] to [6] see Table 6.
*corrected with 1 pt of hexylglycol/100 pts of liquor.

We claim:

1. A curing agent (A) for resins (B) curable by means of isocyanates which has an amine number of 20 to 150 mg of KOH/g and an OH number of not more than 20 mg of KOH/g and contains, per molecule, at least two masked isocyanate groups which are reactive under the conditions of curing, and which is obtained by reacting
  (a) an amine which contains at least one β-hydroxyalkyl group per molecule, has an OH of 100 to 1,200 mg of KOH/g and an amine number of 100 to 1,200 mg of KOH/g with
  (b) a partly masked polyisocyanate.

2. A curing agent as claimed in claim 1, which has an amine number of 20 to 100 mg of KOH/g.

3. A curing agent as claimed in claim 1, which has a molecular weight ($M_n$) of 500 to 20,000.

4. A curing agent as claimed in claim 1, which has 2 to 10 masked isocyanate groups per molecule.

5. A curing agent as claimed in claim 1, wherein the polyamine (a) additionally contains NHCO groups.

6. A curing agent as claimed in claim 1, wherein the partly masked polyisocyanate (b) is present as a mixture with an at least difunctional, OH-reactive and/or NH-reactive compound.

7. A curing agent as claimed in claim 1, wherein the amine (a) contains 4 to 8 β-hydroxyalkyl groups per molecule.

8. A curing agent as claimed in claim 1, wherein the amine (a) has an OH number of 200 to 1,000 mg of KOH/g and an amine number of 300 to 700 mg of KOH/g.

9. A curing agent as claimed in claim 1, wherein the β-hydroxyalkyl groups in the amine (a) have the formulae (III)/(III')

$$-CH_2-\underset{\underset{OH}{|}}{\overset{\overset{R_1}{|}}{CH}}-(CH_2)_n-R_2 \quad \text{(III)}$$

or $$HO-CH_2-\underset{|}{\overset{\overset{R_1}{|}}{CH}}-(CH_2)_n-R_2 \quad \text{(III')}$$

in which:
$R_1$ denotes H or $(C_1-C_6)$-alkyl,
$R_2$ denotes H, a hydrocarbon radical, preferably a (cyclo)alkyl radical, which can carry substituents such as OH groups and has 1 to 12 carbon atoms, $(C_1-C_{10})$-alkoxy or $(C_1-C_{15})$-acyloxy and
n denotes 0 or 1.

10. A curing agent as claimed in claim 1, which has the formula (I)

$$A\left(\underset{|}{\overset{\overset{B}{|}}{-N-C}}\right)_m \quad \text{(I)}$$

in which:
A denotes an organic radical which has 2 to 40 carbon atoms, has a valence of 2 to 10 and optionally contains amino groups and also NHCO and/or NHCONH groups, and
B and C independently of one another denote groupings of the formulae (II)/(II')

$$-CH_2-\underset{\underset{D}{\underset{|}{O}}}{\overset{\overset{R_1}{|}}{CH}}-(CH_2)_n-R_2 \quad \text{(II)}$$

$$-\underset{\underset{D}{\underset{|}{O}}}{\underset{|}{\underset{CH_2}{\overset{\overset{R_1}{|}}{CH}}}}-(CH_2)_n-R_2 \quad \text{(II')}$$

in which $R_1$, $R_2$ and n are as defined in the formulae (III) and (III') in claim 9 and D represents the radical of a masked polyisocyanate (NHCO-F) in which F represents a hydrocarbon radical which has 3 to 40 carbon atoms and optionally contains heteroatoms and contains 1 to 3 masked isocyanate groups which are reactive under the conditions of curing, or
C denotes H or $(C_1-C_6)$-alkyl,
m is an integer from 2 to 10.

11. A curing agent as claimed in claim 1, which additionally contains a reaction product formed from an OH-functional and/or NH-functional compound and a partially masked polyisocyanate.

12. A process for the preparation of the curing agent (A) as claimed in claim 1, which comprises reacting ammonia or an amine containing at least one primary amino group and also, if appropriate, secondary and/or tertiary amino groups and/or, if appropriate, OH groups, with a monoepoxide compound in such a manner that at least one hydroxyalkyl group is introduced into the amine and the amine (a) containing hydroxyalkyl groups thus obtained is then reacted with a partly masked polyisocyanate (b).

13. The process as claimed in claim 12, wherein the amine (a) containing hydroxyalkyl groups is reacted with a difunctional, OH-reactive and/or NH-reactive compound prior to or at the same time as the reaction with the partly masked polyisocyanate (b).

14. The process as claimed in claim 12, wherein the amine (a) is employed as a mixture with another NH-functional and/or OH-functional compound.

15. The process as claimed in claim 12, wherein the amine employed as the starting compound has the formula (IV)

$$H_2N-(R_3N)_p-R_4' \quad \text{(IV)}$$
$$\phantom{H_2N-(R_3N)_p-}\overset{\overset{R_4}{|}}{\phantom{N}}$$

in which
p is zero or an integer from 1 to 6,
$R_3$ represents a divalent, nonaromatic hydrocarbon radical having 2 to 18 carbon atoms, preferably a branched or unbranched alkylene radical having 2 to 10 carbon atoms, or a cycloalkylene radical having 5 to 12 carbon atoms, or a aralkylene radical having 7 to 12 carbon atoms, and
$R_4$ and $R_4'$ independently of one another represent H or $$-R_3-N\underset{R_6}{\overset{R_5}{\diagup\diagdown}}$$

in which $R_3$ has the same meaning as above, and $R_5$ and $R_6$ either independently of one another represent H, $(C_1-C_{20})$-alkyl, preferably $(C_1-C_6)$-alkyl, hydroxy-$(C_1-C_{16})$-alkyl, preferably $$-CH_2-\underset{\underset{OH}{|}}{CH}-R_7 \ (R_7 = H, (C_1-C_{12})\text{-alkyl},$$

$-CH_2-O-(C_1-C_{12})$-alkyl, $-CH_2-O$-aryl or $$CH_2-O-\underset{\underset{O}{\|}}{C}-(C_1-C_{12})\text{-alkyl or } CH_2-\underset{\underset{R_8}{|}}{CH}-CN$$

($R_8$ = H or $(C_1-C_6)$-alkyl) or $R_5$ and $R_6$ are part of a 5-membered, 6-membered or 7-membered aliphatic ring, subject to the proviso that, if p is zero, $R_4$ is not H.

16. The process as claimed in claim 12, wherein the monoepoxide compound has the formula (VI)

$$\underset{O}{CH_2-\overset{\overset{R_1}{|}}{CH}}-(CH_2)_n-R_2 \quad \text{(VI)}$$

in which $R_1$, $R_2$ and n are as defined in formulae (III)/(III').

17. The process as claimed in claim 14, wherein the difunctional, OH-reactive and/or NH-reactive compound is a diisocyanate or a diepoxide.

18. The process as claimed in claim 14, wherein the reaction with the difunctional OH-reactive and/or NH-reactive compound is carried out at the same time as that with the partly masked polyisocyanate (b).

19. A curable mixture containing
   a curing agent (A),
   a binder (B),
   if appropriate a thinner (C) and also, if appropriate, additives (D), wherein the curing agent (A) is the curing agent as claimed in claim 1.

20. A curable mixture as claimed in claim 19, wherein the binder (B) has an average molecular weight ($\overline{M}_n$) of about 1,000 to about 20,000 and contains hydroxyl groups and/or amino groups.

21. In a method of curing a curing resin curable by isocyanates, the improvement comprising using as the curing agent the agent of claim 1.

22. The method of claim 21 wherein the curing resin is in the form of an aqueous paint formulation.

23. The method of claim 22 wherein the paint formulation is an electrodeposition paint.

24. The method of claim 21 wherein the basic amino groups in the agent of claim 1 have been at least partially neutralized.

* * * * *